2 Sheets—Sheet 1.
N. WRIGHT.
PHOTOGRAPHIC APPARATUS.
No. 52,239. Patented Jan. 23, 1866.
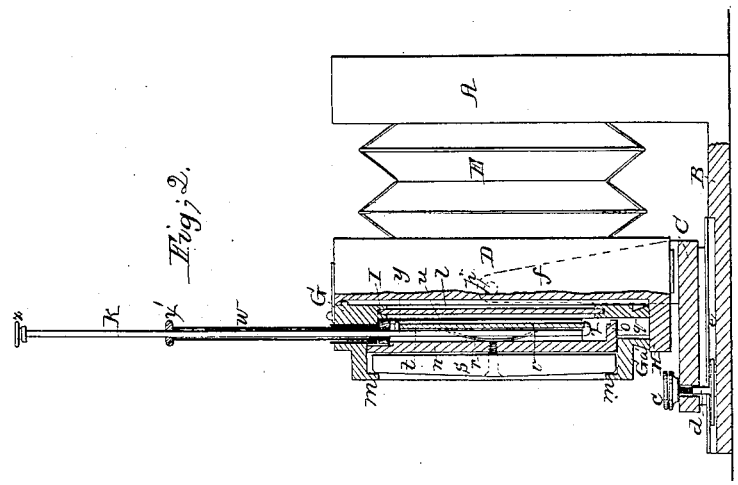
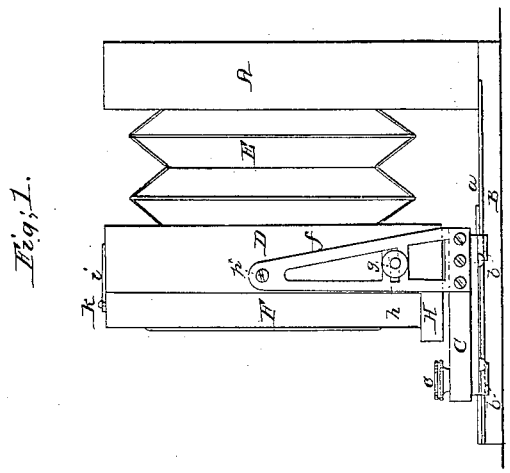
Witnesses:
J. W. Coombs
G. W. Reed
Inventor:
Nelson Wright
per Brown, Coombs & Co
Attorneys N. WRIGHT.
PHOTOGRAPHIC APPARATUS.
No. 52,239. Patented Jan. 23, 1866.
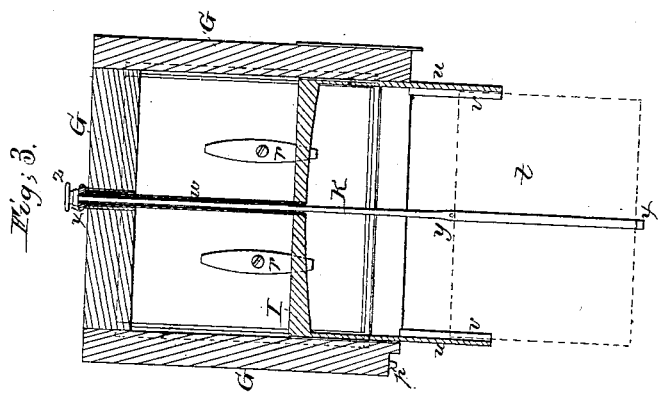
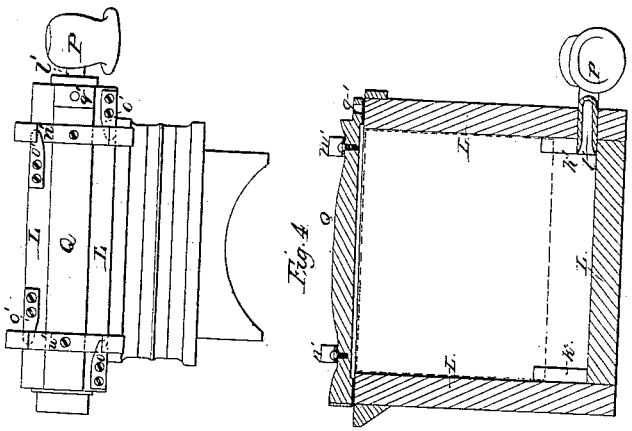
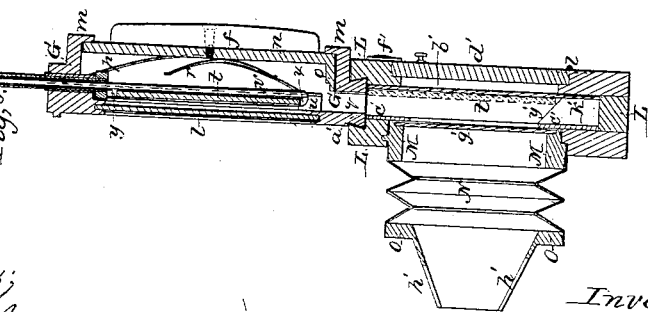

UNITED STATES PATENT OFFICE.

NELSON WRIGHT, OF NEW YORK, N. Y.

IMPROVEMENT IN PHOTOGRAPHIC APPARATUS.

Specification forming part of Letters Patent No. 52,239, dated January 23, 1866.

*To all whom it may concern:*

Be it known that I, NELSON WRIGHT, of the city, county, and State of New York, have invented certain new and useful Improvements in Photographic Apparatus, of which the following is a full, clear, and exact description, reference being had to the accompanying drawings, all of which form a part of this specification, in which—

Figure 1 is a side elevation of a camera constructed according to my improved plan. Fig. 2 is a longitudinal vertical section of the said camera with the plate-holder attached. Fig. 3 is a vertical section of the plate-holder parallel with the face of the plate, which is represented in red outline. Fig. 4 is a horizontal section of the developing-tray. Fig. 5 is a top view of the developing-tray. Fig. 6 is a vertical section of the developing-tray with the plate-holder attached.

Similar letters indicate corresponding parts of the apparatus in all the figures of the drawings.

The object of my invention is to obtain a complete portable photographic apparatus which is particularly adapted for the taking of photographic pictures by the wet process, out doors or in any place where it would be impossible to provide a dark-room or dark-tent for that purpose, or where circumstances would make it very troublesome and expensive to do so. By the peculiar construction of this improved photographic apparatus great facilities are afforded for transferring the plates from one part of the apparatus to another part thereof, so as to pass through the several necessary processes of preparing the plates, of taking the pictures, and of developing them without the plates being in the least exposed to the light and without the aid of a dark-room. For this purpose those parts of the apparatus into which the plates have to be transferred from the plate-holder, or from which they have to be transferred to the plate-holder, are provided with a slide, to which the plate-holder can be attached, and as the slide is removed the plate-holder fills its place and prevents the light from entering, and in the same manner when the plate-holder is withdrawn the slide will follow directly in conjunction with the plate-holder, and thus keep the apparatus closed.

Another part of the invention relates to the construction of the camera, whereby greater facility is afforded for the adjustment of the vertical position of the plate. For this purpose the adjustable back part of the camera, which supports the plate-holder, is swiveled centrally to the bottom board, and is provided with a set-screw to secure it in the desired position.

Another part of the invention relates to the construction of the developing-tray, whereby the necessity of a dark room or tent for the developing process is dispensed with.

I will now further describe my improvements with reference to the drawings and the letters thereon, to enable others to make and use them.

A, Figs. 1 and 2, represents the front of the camera, to which the object-glass or lens, which is not represented in the drawings, is to be attached. This front A is firmly attached to and is supported by a bottom board or foundation, B. A sliding piece or carriage, C, is fitted to the said foundation B in such a manner that it can freely slide thereon, and for the purpose of the carriage C being guided the foundation B is provided on each side with a metallic feather or tongue, $a$, which is fitted into grooves of a piece, $b$, attached to the bottom of the said carriage C. By means of a nut, $c$, and bolt $d$, the head of which slides in a grooved recess, $e$, Fig. 2, the said carriage C is held in the desired position. To each side of this carriage C a standard, $f$, is firmly secured by means of screws or in any other substantial manner. The said standards $f$ support between them a frame, D, which is attached to them by means of two opposite screws or pivots, $p^*$, at about the center of the said frame, so that it can swing between the said standards $f$.

By means of a screw-bolt being attached to the frame D and passing through a curved slit, $h$, in the standard $f$, and by a nut, $g$, the position of the frame D after it has been properly adjusted is firmly secured. This swinging frame D constitutes the back part of the camera, and is connected with the front A by means of the folding or extension part E, of bellows-like construction.

By moving the carriage C the folding or extension part E will be either extended or contracted, and consequently the camera can in this manner be made longer or shorter, according as it will be requisite, and after the camera has thus been adjusted longitudinally and the carriage C is secured in its position by means of the nut c the frame or back part D of the camera can further be adjusted on the pivots $p^*$ to any desired or required angle, and be then secured in its position by the nut $g$, as stated before.

The swinging part D is provided with a projecting part or ledge, H, at the bottom, which is a support both for the focusing-glass holder or the plate-holder. By arranging the back of the camera to swing on pivots supported on the carriage C very great convenience is afforded for its adjustment. In large cameras the swinging front is impracticable, as it is out of reach of the operator while focusing at the rear; but the arrangements of swinging backs heretofore made have also been very inconvenient, and have required an addition to the camera, which increased its length.

F, Fig. 1, is the frame which holds the focusing-glass, and is attached and held to the camera by means of proper recesses and projections and by a hook, $i$, at the top part, catching over a pin or screw, $k$. The plate-holder is attached to the camera in the same manner. (See Fig. 2.)

G, Figs. 2, 3, and 6, is the frame of the plate-holder, which has an opening, $q$, at the bottom, through which the plates are received and delivered. The front part of said frame is provided with a dark-slide, $l$, made and applied in the usual manner. At the back of said frame flanges $m$ project inward, forming a recess all around, into which a loose back, $n$, is fitted in such a manner that it can move freely backward and forward therein. The said back $n$ is provided at the bottom with a ledge, $o$, which covers the opening $q$ when the back is pressed forward, and thus prevents the light from entering into the plate-holder through this opening $q$.

$p\ p$ are springs at the sides of the loose back $n$, inside of the plate-holder, by which the said back $n$ is pressed outward and held in that position if required. $r\ r$ are two springs on the inner side of the loose back, which press the plate $t$, Fig. 2, forward into its proper position or focus when the back is pressed forward.

The loose back $n$ is provided on the outside with a swiveled bar, $s$, by which the said back $n$, when it has been pressed forward, can be retained in that position by means of the ends of bar $s$ being brought under the flanges $m$.

The back part of the plate-holder, in which the loose back $n$ vibrates, is made separately from the front, whereby better facility is obtained to fit and insert the loose back $n$ and the springs $p$. This said back part is made somewhat smaller than the front part of the plate-holder, and both parts are firmly united by means of screws or in any other substantial manner.

The plate-holder is provided with a sliding frame or carriage, I, the two side pieces, $u$, of which are made of whalebone, hard vulcanized india-rubber, or other suitable material, and are provided with proper recesses or grooves $v$ for the reception of the plate-glass $t$. This frame I is fitted into grooves inside of the frame G. The said grooves run parallel with the opening $q$ of the plate-holder. To the top of the said sliding frame or carriage I, at or near the center, a tube, $w$, of hard vulcanized india-rubber is firmly attached, which passes through an opening in the top of the plate-holder, wherein it can slide. The said tube $w$ is of such a length as to allow the carriage I to be pushed out about half-way through the opening $q$ at the bottom of the plate-holder, as shown in Fig. 3, and is provided at the top with a knob, $x'$, and the opening in the plate-holder through which the said tube $w'$ passes is provided with proper packing, so that no light can enter.

K is a whalebone rod, which has a projecting nose, $x$, at the lower end, and a stud or pin, $y$, at a proper distance above, so that a plate of glass of the proper size will loosely fit between the nose $x$ and the said pin $y$. The upper part of this rod K is made to fit into the tube $w$, so that it can freely turn and slide therein, and is made of such a length that it can be projected below the carriage a distance nearly the width of the plate, as shown in Fig. 3, so that when a plate of glass is supported by the nose $x$ of the rod K the upper corners of said glass plate will rest in the grooves $v$, and will be held by the side pieces, $u$, of the carriage I.

To the upper end of the rod K a knob, $z$, is firmly attached, which allows the said rod to be projected the proper distance, and by the means of which it can be raised, lowered, or turned around, as occasion may require.

This construction of the carriage and its appurtenances allows the plate alone to be lowered into the silver-bath, the central rod, K, being long enough to extend so far down through the lower end of the hollow rod as to suspend the plate with its upper edge clear of everything but the pin $y$, and even this pin may be dispensed with, the upper part of the plate being steadied by the upper parts of its sides remaining in the lower parts of the grooves $v\ v$ of the side pieces, $u\ u$ of the carriage I, as shown in Fig. 3.

The lower end of the frame G of the plate-holder is made in the form of a male dovetail, $a'$, by which the plate-holder is connected with the developing-tray, (see Fig. 6,) and likewise with the silver-bath. As the connection of the plate-holder with either the silver-bath or the developing-tray is effected in the same manner, I shall therefore describe the developing-tray only, and explain how the connection of the plate-holder is made therewith and the glass plates are changed from the plate-holder into the developing-tray.

L, Figs. 4, 5, and 6, is the outside or frame of the developing-tray, which has an opening at the back and front and one at the top. A yellow-glass plate, b', is placed inside the tray to cover the back opening, and the sides and bottom of the tray are lined with glass. Two strips of glass, c', are placed in the front opening, one toward the bottom and one toward the top of the tray, and all these glasses are laid with their edges into india-rubber or otherwise cemented together, so as to be water-tight. Into the back part of the tray, outside of the yellow-glass plate, a door, d', is accurately fitted and attached to the frame L by means of hinges e', and when closed is held by a button, f, in its position. (See Fig. 6.) The inside of the door d' should be covered with a reflecting substance. Into the front opening of the said tray a frame, M, is tightly fitted in such a manner that it can easily be attached thereto or removed therefrom. This frame M is provided with a yellow-glass plate, g', where it connects with the outer frame, L, of the developing-tray, which is tightly fitted and firmly secured in it. A sight-box, h', which is so shaped that it can be closely applied to the eyes or face, is attached to a frame, O, and this is connected with the frame M by means of an extension part or bellows, N. Into the bottom of the developing-tray two pieces of rubber, K', or of other suitable elastic substance, are placed, one at each side of the tray, the upper ends, y', of which are made to incline toward the yellow-glass plate b', (see Fig. 6,) so that when a plate, t, is dropped into the tray the said plate t will come in close contact with the yellow-glass plate b'.

P, Figs. 4 and 5, is a cup or funnel placed on one side, near the bottom, of the developing-tray, and communicates with the inside thereof by means of a hollow stem, l', for the purpose of supplying the developing-tray with the developing solution or water and of pouring out the said solution or water therefrom.

The top-cover Q of the developing-tray is provided with a male dovetail, which fits accurately into a female dovetail in the top part of the tray. The inside of the said top-cover Q is provided with an elastic packing, m', and the outside has two swiveled springs, n' n', attached to it, by means of which, when they are depressed at their ends and secured under the projecting prongs O', the top part of the developing-tray will be made perfectly water-tight.

The male dovetail a', on the lower part of the plate-holder is made to coincide with the dovetail of the top-cover Q, and for this purpose they are lapped together; and the plate-holder is provided with a pin, p', Fig. 3, and the top-cover Q is provided with a hole, q', Figs. 4 and 5, to fit the pin p'.

When a plate is to be transferred from the plate-holder to the developing-tray without exposing the plate to the light, the springs n' of the top-cover Q must be relieved at their ends. The pin p' of the plate-holder is then inserted into the hole q' at the end of the top-cover Q, and the plate-holder is pushed or pressed against the end of the top-cover Q, and as the said top-cover is pressed out it will be replaced by the plate-holder. A stop on one side of the plate-holder will arrest it when brought into proper position. The ends of the bar s at the back of the plate-holder are now withdrawn from under the flanges m, and the back n is allowed to fall back to its original position. This withdraws the ledge o from the opening q at the bottom of the plate-holder, and free communication between the plate-holder and the developing-tray is established. The glass plate t is now lowered into the developing-tray by turning around the rod K, and in this manner the nose x is withdrawn from under the glass plate, which now drops into elastic pieces k'. The back n is pressed forward and secured in that position by means of the bar s. This has brought the ledge o forward and closed the opening q. The plate-holder is then withdrawn and the top-cover Q will follow, and thus keep the opening at the top of the developing-tray closed. The top of cover Q is now firmly fastened by means of the springs n' n'. The developing-tray is turned with its back downward, and through the cup or funnel P a sufficient quantity of developer is poured into the tray. The door d' at the back of the tray is next opened, and the said tray has such movement given to it by the hands of the operator that the developer will flow freely over the plate. Its action can be watched through the yellow glass, and light can be thrown through the under side by means of the reflector upon the door d'. When the picture is developed the solution is poured out through the cup or funnel P and water is poured in to wash the picture. When the picture has been washed thoroughly the water is poured out, the top-cover Q is slid off, the extension-box or bellows N and those parts which are permanently connected therewith are removed, and the plate is taken out and fixed, and then placed in the plate-box.

The developing-tray is afterward washed, and it is ready for a repetition of the operation.

What I claim as my invention, and desire to secure by Letters Patent, is—

1. Suspending the entire back of the camera, substantially as herein specified, on pivots $p^*$, supported upon the carriage C, which slides back and forth upon the bottom board of foundation B.

2. In combination with the carriage I of the plate-holder, constructed with grooved sides v v and a hollow rod, w, the central rod, K, constructed extending downward right through and below the hollow rod and carriage, and operating substantially as herein specified.

3. Providing the developing-trays and the baths for photographic purposes with sliding covers, so applied and furnished with means of attachment to the plate-holder that the said cover may be slid off and drawn back to their places, substantially as herein described, by the application of the holder to the plate or bath, thereby allowing the plate to be transferred from the holder to the tray or bath without exposure to the light.

4. Furnishing the developing-tray with a sight-box, G, connected by means of a bellows-like extension, substantially as and for the purpose herein specified.

5. Furnishing the bottom of the developing-tray with elastic corner pieces $k'$ $k'$, having their upper surfaces inclined toward the glass back $b'$, substantially as and for the purpose herein specified.

6. The construction of the developing-tray with one side, M $g'$, movable, substantially as herein described, to provide for the cleaning.

7. The elastic lining $m'$ of the lid, in combination with the elastic lower corner pieces, $k'$ $k'$, substantially as herein described, for the purpose of holding the plate during the developing and washing processes.

NELSON WRIGHT.

Witnesses:
HENRY T. BROWN,
J. W. COOMBS.